(12) United States Patent
Pepe et al.

(10) Patent No.: US 10,682,981 B2
(45) Date of Patent: Jun. 16, 2020

(54) SYSTEMS AND METHODS FOR NETWORKED DEVICE SECURITY

(71) Applicant: UNIQUID INC., San Francisco, CA (US)

(72) Inventors: Stefano Pepe, San Francisco, CA (US); Giuseppe Cardinale Ciccotti, Rome (IT); Marco Palumbi, Rome (IT); Ivan Minutillo, Rome (IT); Giuseppe Magnotta, Rome (IT)

(73) Assignee: Uniquid, Inc., San Francisco, CA (US)

( * ) Notice: Subject to any disclaimer, the term of this patent is extended or adjusted under 35 U.S.C. 154(b) by 0 days.

(21) Appl. No.: 16/002,712

(22) Filed: Jun. 7, 2018

(65) Prior Publication Data
US 2019/0375373 A1  Dec. 12, 2019

Related U.S. Application Data

(60) Provisional application No. 62/571,002, filed on Oct. 11, 2017.

(51) Int. Cl.
*B60R 25/24* (2013.01)
*H04L 9/30* (2006.01)
(Continued)

(52) U.S. Cl.
CPC .......... *B60R 25/246* (2013.01); *B60R 25/04* (2013.01); *B60R 25/209* (2013.01); *B60R 25/241* (2013.01); *G06Q 20/32* (2013.01); *H04L 9/088* (2013.01); *H04L 9/30* (2013.01); *B60R 2325/106* (2013.01); *B60R 2325/205* (2013.01); *G06Q 2240/00* (2013.01); *H04L 67/12* (2013.01); *H04M 1/72527* (2013.01); *H04W 4/80* (2018.02)

(58) Field of Classification Search
CPC ..... B60R 25/246; B60R 25/04; B60R 25/209; B60R 25/241; B60R 2325/106; G06Q 20/32; G06Q 2240/00; H04L 9/088; H04L 9/30; H04L 67/12; H04W 4/80; H04M 1/72527
See application file for complete search history.

(56) References Cited

U.S. PATENT DOCUMENTS 9,666,005 B2 * 5/2017 Ellis ................... G07C 9/00309
9,794,753 B1 * 10/2017 Stitt ..................... H04B 17/318
(Continued)

FOREIGN PATENT DOCUMENTS

WO 2017095036 A1 6/2017

OTHER PUBLICATIONS

"Bitcoin: A Peer-to-Peer Electronic Cash System", Satoshi Nakamoto Institute, Oct. 31, 2018, 7 pages.
(Continued)

*Primary Examiner* — Omar Casillashernandez
(74) *Attorney, Agent, or Firm* — Vierra Magen Marcus LLP

(57) ABSTRACT

A networked device includes a network input/output and an access control list with a plurality of different available levels of access for entities communicating with the networked device through the network input/output. An access manager is configured to update the access control list from a blockchain via communication with the blockchain through the network input/output.

20 Claims, 13 Drawing Sheets

(51) Int. Cl.
*H04L 9/08* (2006.01)
*G06Q 20/32* (2012.01)
*B60R 25/20* (2013.01)
*B60R 25/04* (2013.01)
*H04L 29/08* (2006.01)
*H04M 1/725* (2006.01)
*H04W 4/80* (2018.01)

(56) References Cited

U.S. PATENT DOCUMENTS

| | | | |
|---|---|---|---|
| 9,858,781 B1* | 1/2018 | Campero | G06F 9/451 |
| 2007/0223702 A1* | 9/2007 | Tengler | H04L 9/3263 |
| | | | 380/270 |
| 2014/0143840 A1* | 5/2014 | Miller | H04L 63/102 |
| | | | 726/4 |
| 2015/0081161 A1* | 3/2015 | Chapman | G07C 5/008 |
| | | | 701/31.5 |
| 2016/0261690 A1* | 9/2016 | Ford | H04L 67/1044 |
| 2016/0358158 A1* | 12/2016 | Radocchia | G07G 1/0081 |
| 2017/0136990 A1* | 5/2017 | Tercero | B60R 25/24 |
| 2017/0236343 A1* | 8/2017 | Leboeuf | H04L 9/0825 |
| | | | 340/5.61 |
| 2017/0279801 A1* | 9/2017 | Andrade | H04L 63/08 |
| 2018/0101842 A1* | 4/2018 | Ventura | G06F 11/1458 |
| 2018/0108024 A1* | 4/2018 | Greco | H04L 9/3236 |
| 2018/0219676 A1* | 8/2018 | Mattingly | H04L 9/3239 |
| 2018/0342036 A1* | 11/2018 | Zachary | G06Q 30/0265 |
| 2019/0044917 A1* | 2/2019 | Mork | H04L 63/0428 |
| 2019/0340269 A1* | 11/2019 | Biernat | G06F 16/27 |

OTHER PUBLICATIONS

Kshetri, Nir, "Can Blockchain Strengthen the Internet of Things?", IEEE Computer Society, 2017, 5 pages.

Lerner, Sergio Demian, "Lumino Transaction Compression Protocol (LTCP)", REV: 10, Feb. 24, 2017, 10 pages.

* cited by examiner

US 10,682,981 B2

SYSTEMS AND METHODS FOR NETWORKED DEVICE SECURITY

CROSS-REFERENCE TO RELATED APPLICATIONS

The present application claims the benefit of U.S. Provisional Patent Application No. 62/751,002, filed on Oct. 11, 2017, which is hereby incorporated by reference in its entirety.

BACKGROUND

The present disclosure relates to technology for securing networked devices. An increasing number of devices are being connected to networks such as the Internet to provide additional or enhanced functionality. In some cases, such networked devices may be simple devices with limited functions, while in other cases networked devices may be sophisticated devices. Securing networked devices is increasingly important as the number of such devices increases and as people become increasingly reliant on them.

BRIEF DESCRIPTION OF THE DRAWINGS

The present disclosure relates to technology for securing networked devices.

SUMMARY

Figure 1:
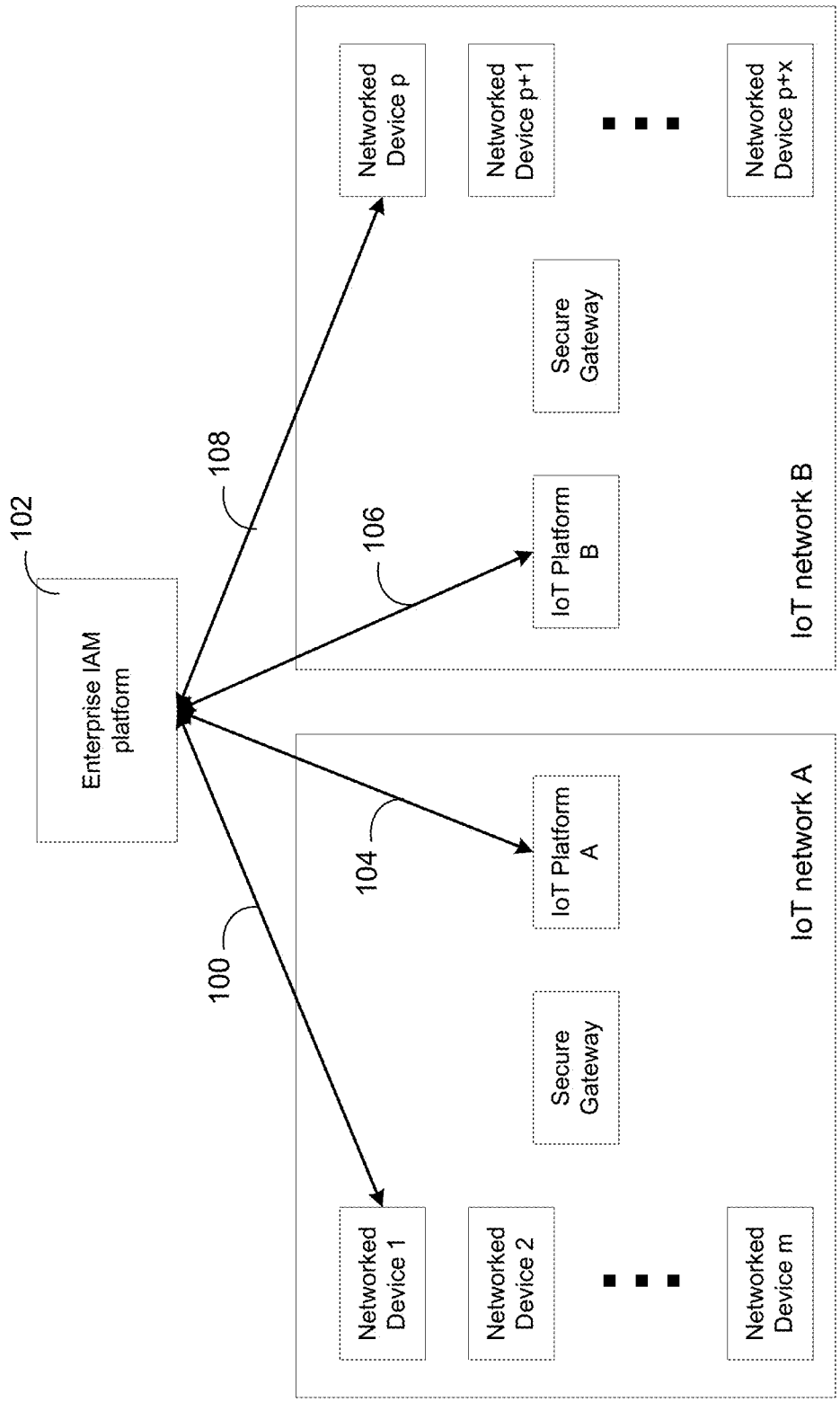
FIG. 1 shows an example of a trust based system.

An example of a networked device includes a network input/output; an access control list with a plurality of different available levels of access for entities communicating with the networked device through the network input/output; and an access manager configured to update the access control list from a blockchain via communication with the blockchain through the network input/output.

The networked device may include a key pair generation unit configured to generate a private key and a corresponding public key for the networked device. The networked device may include secure element storing a private key of the networked device. The networked device may include an authenticator configured to use a private key of the networked device to authenticate communication and demonstrate that the networked device has the private key associated with a public key of the networked device. The access control list may include public keys of a plurality of entities connected to the networked device through the network input/output. The access manager may be configured to update the access control list according to metadata stored in a transaction in the blockchain. The networked device may be located in a vehicle and the access control list may provide a level of access to a vehicle user that allows the vehicle user to lock and unlock vehicle locks. The level of access may further allow the vehicle user to turn vehicle ignition on and off.

An example of a system includes a plurality of networked devices, an individual networked device comprising: a network connection; a key generator configured to generate a public/private key pair for the individual networked device; a private key store containing the private key of the individual networked device; an identity authenticator configured to authenticate identity of the individual networked device using the private key of the individual networked device; an access control list in the individual networked device, the access control list assigning a plurality of different levels of access to other networked devices of the plurality of networked devices for accessing the individual networked device; and an access manager in the individual networked device, the access manager configured to update the access control list from a blockchain through the network connection.

The plurality of networked devices may be located in a plurality of vehicles, an access control list of an individual networked device may be configured to control access to one or more of: vehicle locks, vehicle ignition, vehicle location data, vehicle maintenance data, and vehicle payment data. The access control list of the individual networked device may be configured to grant a smartphone of a vehicle user access to at least vehicle locks and vehicle ignition through a blockchain transaction. The access control list of the individual networked device may be configured to grant a toll-collecting networked device access to at least vehicle payment data.

An example of a method of initializing networked devices includes providing power to a first networked device; generating an initial blockchain transaction that links the first networked device to an administrator; and placing the first networked device in communication with at least a second networked device to initiate a device blockchain transaction between the first networked device and the at least a second networked device to thereby link the first networked device with the at least a second networked device.

The initial blockchain transaction may identify a public key of the administrator. The device blockchain transaction may identify a public key of the at least a second networked device as public key of a peer device. The providing, the generating, and the placing take place in a secure environment. The first networked device may be placed in communication with the second networked device through a communication channel and the communication may be disabled after the device blockchain transaction is recorded. The first networked device may be located in a vehicle and the method may include storing vehicle data for the vehicle in one or more blockchain transactions. The first networked device may be located in a vehicle and the second networked device may be a vehicle user networked device, the method including, in response to a request from the second networked device to the first network device to unlock the vehicle, reading the device blockchain transaction and unlocking the vehicle. The first networked device may be located in a vehicle and the second networked device may be an external transponder, the method including the second networked device verifying vehicle payment information from the device blockchain transaction and in response providing the vehicle access to at least one of: a toll road and a parking location.

DETAILED DESCRIPTION

Introduction

Certain aspects of the present technology described herein relate to network connected devices and security features associated with such devices. Aspects of this technology are applicable to low cost networked devices including devices considered part of the internet of things ("IoT"), also referred to as "endpoints," as well as more costly and sophisticated networked devices.

The Internet is increasingly applied to connect vehicles, appliances, public utilities and buildings. This phenomenon may be referred to as the Internet of Things (IoT). For example: cars may be remotely tracked, so users can rent them paying on a per-minute basis. Industrial appliances may be monitored for predictive maintenance using a variety of networked sensor devices, allowing remote diagnosis and early failure prevention. Utilities may leverage networked devices such as smart meters to better allocate how and when resources are needed (energy, water, gas). Smart buildings may control illumination and HVAC (heat, ventilation, air conditioning) leveraging networked sensors to increase energy efficiency and savings The IoT is expected to bring many new networked devices (devices that have network connections allowing them to connect to a network such as the Internet, an intranet, or other network). Experts estimate within 2025 up to 500 billion connected devices and a total market value of $19 trillion. However, the Internet has been designed for completely different challenges and the application to connected things is raising important concerns on flexibility, scalability, and security.

Flexibility is hampered by the search for economies of scale, which is necessary to offer products with competitive price and time-to-market. This demand is accelerating a transition from capital intensive and custom-tailored solutions to standardized platforms. The result is a proliferation of vertical, highly specialized software-as-a-service (SaaS) products, connected to proprietary hardware devices. These solutions are capable of solving very specific problems providing high efficiency and low initial costs, but they tend to be isolated and not interoperable with the pre-existing architecture (e.g. identity access management (IAM), enterprise resource management, billing platforms, etc.).

Where interoperability is desirable, system integration may allow these new components to be plugged into the pre-existing architecture. The scalability of this approach quickly becomes an important financial burden: market competition is driving a great amount of fragmentation and no clear-cut winners, therefore enterprises risk supporting numerous devices, standards, and SAAS services to completely satisfy their IoT strategy needs, thereby increasing their system integration needs.

To keep costs and complexity under control, typical system integrations rely on computational trust principles. The notion of trust has emerged in human society to allow humans to make decisions under uncertain circumstances. It has been proposed that computing entities can make decisions based on a computational model of trust. This computational trust model needs to be tied to centrally managed systems, such as certification authorities and public key infrastructures (PKI), responsible to store and preserve the integrity of trustable identities. A vulnerability in this central authority can compromise the security and trust for the whole platform.

FIG. 1 illustrates an example of a trust based system. Two IoT networks, IoT network A, which includes m networked devices 1 to m in communication with IoT platform A through a secure gateway, and IoT network B, which includes x networked devices networked devices p to p+x in communication with IoT platform B through a secure gateway. In order for networked device 1 of IoT network A to securely communicate with networked device p of IoT network B, network device 1 is first authenticated 100 by Enterprise IAM platform 102, which requires communication 104 with IoT platform A and authentication 106 from IoT platform B, before authorizing 108 network device p. These sequential steps may take significant time and maintaining enterprise IAM platform 102 may create significant overhead and complexity.

Computational trust principles have proven to be faulty and reliance on a third party may be considered as an introduction of a security hole into a technological system. Furthermore, trusted third parties may add cost to secure communications. While such costs may be acceptable in some circumstances, the relatively low-value of some individual IoT devices and their communications may make such costs unacceptable. Failing to secure such devices may allow them to be easily hacked and used for malicious purposes (e.g. distributed denial-of-service, or "DDoS" attacks).

Figure 2:
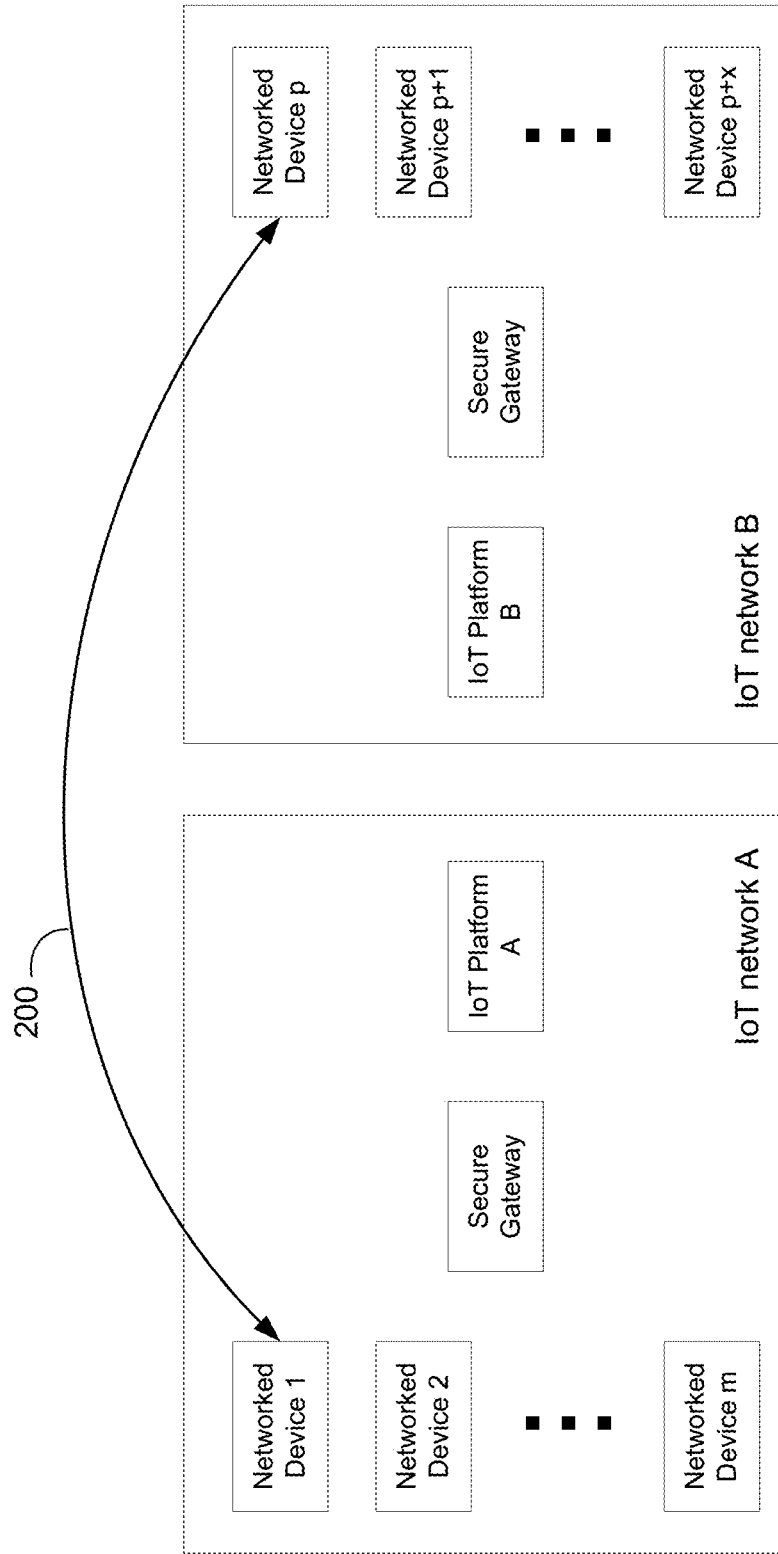
FIG. 2 illustrates an example of authentication between networked devices.

Aspects of the present technology facilitate connectivity of networked devices, including devices connected to the internet, in a secure, flexible, and scalable manner, without requiring the involvement of a trusted third party, and at low cost. Some aspects of the present technology use blockchain technology (also referred as "distributed ledger" technology) to ensure security of networked devices. FIG. 2 illustrates an example of authentication 200 between networked device 1 and networked device p that does not require a trusted third party such as enterprise IAM platform 102 of FIG. 1. Secure transactions may occur between various networked devices of different networks without involvement of trusted third parties according to this technology.

Figure 3:
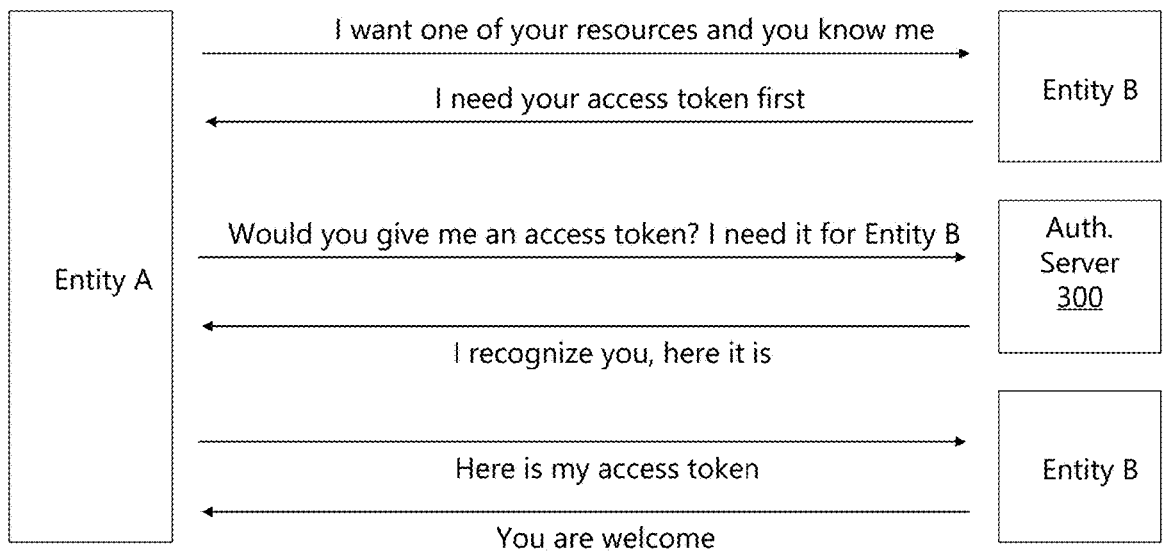
FIG. 3 illustrates an example of authentication using a trusted third party.

FIG. 3 illustrates another example of authentication between two entities, entity A and entity B, that uses a trusted third party (in this case, authorization server 300). The interaction is shown as a series of requests and responses between Entity A, Entity B, and Authorization server 300 in chronological order from the top down. Entity A sends a request to Entity B, "I want one of your resources and you know me" in response to which Entity B sends the response, "I need your access token first." Entity A then sends a request to Authorization server 300, "Would you give me an access token? I need it for Entity B" in response to which Authorization server 300 sends the response, "I recognize you, here it is." Then, Entity A sends the token to Entity B, "Here is my access token" and Entity B recognizes receipt of the token, "You are welcome," at which point Entity B may provide resources to Entity A.

Figure 4:
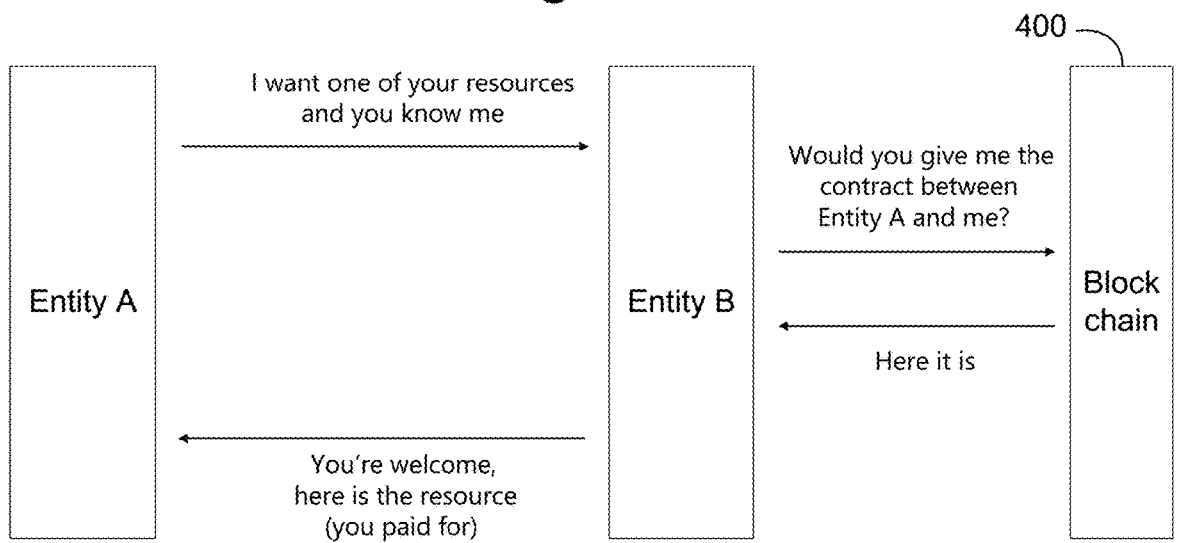
FIG. 4 illustrates an example of authentication without a trusted third party.

In contrast to the series of exchanges of FIG. 3, FIG. 4 shows a simpler authentication that does not require a trusted third party such as Authorization server 300 of FIG. 3. Entity A requests a resource from Entity B, "I want one of your resources and you know me" and in response Entity B checks blockchain 400 by sending a request for a transaction (e.g. to one or more nodes of blockchain 400) "Would you give me the contract between Entity A and me?" In this case, the transaction is a contract or "smart contract" between Entity A and Entity B. Blockchain 400 returns the contract that specifies the relationship between Entity A and Entity B and Entity B uses this to determine if Entity A has an appropriate level of access to receive the resources it requested. In response to determining from the contract that Entity A is authorized to access the resources (e.g. has "paid" for the specified resources), Entity B responds, "You're welcome here is the resource (you paid for)" and provides the specified resources to Entity A. Thus, a secure transaction is initiated without a trusted third party using a blockchain (or "distributed ledger" for authentication, and for additional functions to facilitate the secure transaction).

While the example of FIG. 4 shows a request to blockchain 400 by entity B in response to the request from Entity A, in some cases, Entity B may already have a copy of the contract from a prior interaction with blockchain 400 to allow access and thus does not need to separately communicate with Blockchain 400 at the time when a request from Entity A is received. Interaction with blockchain may be synchronous (e.g. requesting a corresponding transaction in response to a request as shown in FIG. 4) or may be asynchronous (e.g. obtaining transactions from a blockchain at times that may not correspond to particular requests for access). Entity B may request updates from blockchain 400 periodically, or blockchain 400 may push copies of relevant transactions to Entity B. In some examples, some or all transactions of a blockchain may be stored by Entity B so that checking a blockchain may be an internal operation and may not require communication through a network connection. In some cases, an entity only checks a blockchain for access information for unrecognized entities, e.g. Entity B may first check if it already has access level information regarding Entity A and only request the contract if it does not already have the access information.

It will be understood that Entity A may be a networked device that also has access to blockchain 400 so that Entity A may also obtain a copy of a contract from Blockchain 400 to determine what level of access to give to Entity B (this function is omitted from FIG. 4 for simplicity and clarity). Thus, levels of access in both directions between Entities A and B may be established from Blockchain 400. While two entities are used for simplicity in this example, it will be understood that any number of entities may determine respective access levels in this manner from a blockchain.

Figure 5:
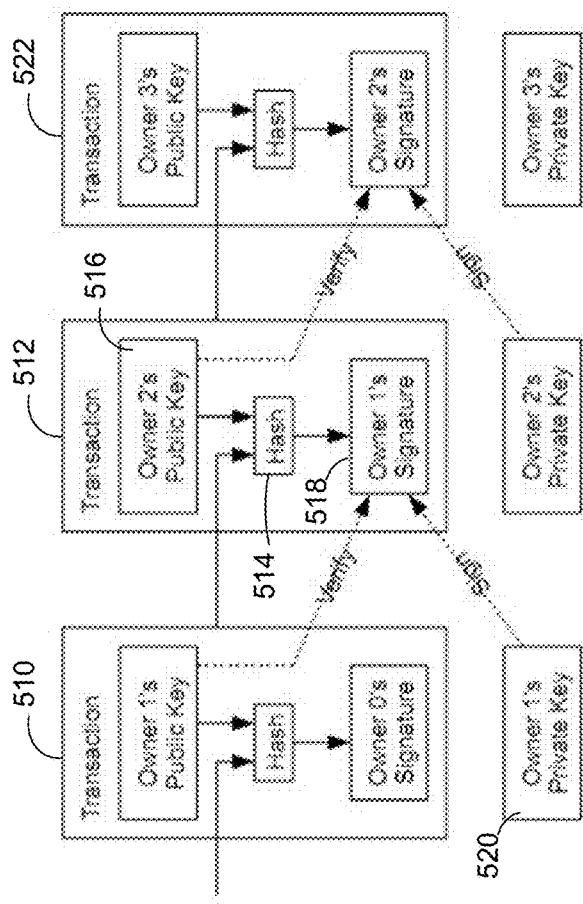
FIG. 5 illustrates blockchain transactions.

It will be understood that a blockchain such as blockchain 400 is a list, or chain, of records (blocks) which are linked and cryptographically secured. Blockchains for use as electronic cash were proposed by Satoshi Nakamoto in 2008 in a paper entitled "A peer-to-peer electronic cash system" which became the basis for using blockchain technology in Bitcoin and other cryptocurrencies. FIG. 5 (from Nakamoto's paper) illustrates how transactions are used to transfer coins or tokens, with an owner transferring a coin to the next owner by digitally signing a hash of the previous transaction and the public key of the next owner and adding these to the end of the coin (where the coin is defined as a chain of digital signatures). A first transaction 510 transfers ownership from Owner 0 to Owner 1. Subsequently, a second transaction 512 transfers ownership from Owner 1 to Owner 2 by generating a hash 514 of Owner 2's public key 516 and first transaction 510, using Owner 1's signature 518, which is generated using Owner 1's private key 520 to verify Owner 1's identity (i.e. only the holder of the private key associated with Owner 1's public key can sign and approve this transaction). Subsequently, a third transaction 522 transfers ownership from Owner 2 to Owner 3 in a similar manner and so on from owner to owner. In this way, each transaction involves two parties, identified by public keys, and leaves a transaction record so that the ownership may be verified at any time.

Figure 6:
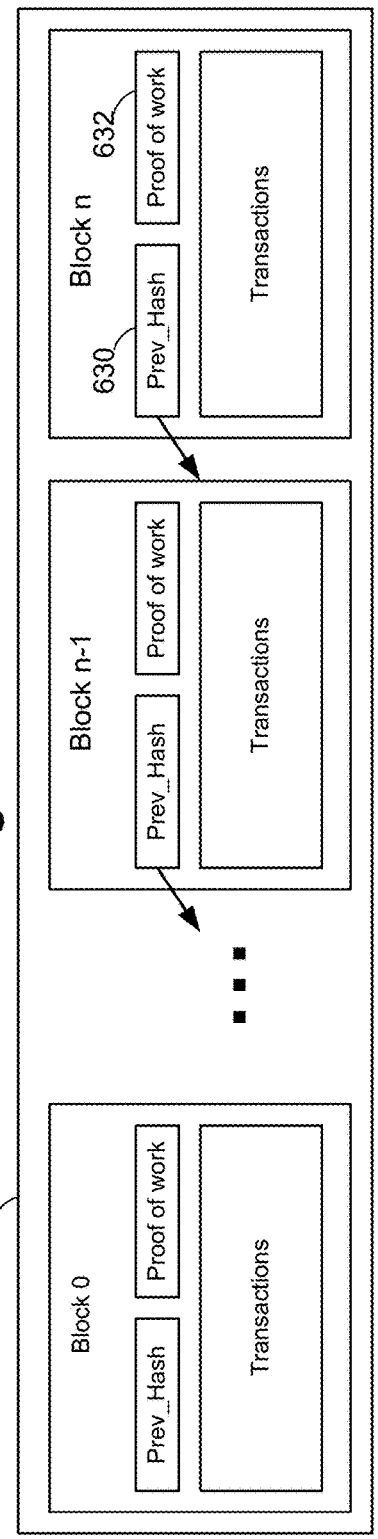
FIG. 6 illustrates blockchain transactions recorded in a blockchain.

FIG. 6 illustrates how transactions are recorded in blocks of a blockchain 600. A blockchain block may contain a number of transactions, which may vary from block to block (e.g. about 2,500 transactions per block is common in current Bitcoin blocks). Transactions in a given block may be unrelated to each other (e.g. referring to different coins or tokens, between different parties, etc.) and may be selected according to the time during which transactions are sent to blockchain nodes (i.e. to computer systems that run blockchain software). Transactions may be broadcast to blockchain nodes for inclusion in the current block. Thus, a given block may contain transactions received during a certain time interval (e.g. about a 10-minute interval for current Bitcoin blocks). Each blockchain block contains a hash of the previous block and a proof of work. Thus, Block n contains a hash 630 of Block n−1 and proof of work 632, which may be a nonce calculated to ensure that an output meets certain criteria when Block n is hashed. Calculating such a nonce may take significant computing power and the first computer to calculate an acceptable nonce may be paid in coin, token, or unspent transaction output (UTXO). This payment may come from small fees paid for individual transactions of a block and creates an incentive for multiple nodes to maintain the blockchain by "mining" coins. Other computers in the system can easily verify the nonce and the block is then accepted. Once a block is validated in this manner, changing any transaction in the block is easily detectable because the hash of the block would be very different. As each block contains a hash of the prior block, undetected modification becomes more and more difficult over time. Blockchain software may be run on many computers (or nodes) so that no single entity controls the blockchain. Thus, blockchains are considered a highly secure and immutable way to record data such as transactional data without relying on a trusted third party.

Blockchain technology has also been used for "smart contracts." The term "smart contracts" may refer to software that executes some transaction when appropriate conditions are met. For example, a coin or token may be transferred from one owner to another when a predetermined condition is met, e.g. payment is automatically made when an item is delivered. More broadly, a smart contract may establish a relationship between two or more parties (including between buyer and seller) that can be recorded in a blockchain so that the relationship can be verified and may be updated with appropriate authorization. Thus, a blockchain may be used for more than transferring value (coins or tokens). According to some aspects of the present technology, networked devices may establish relationships through blockchain transactions based on public/private key pairs associated with individual networked devices. These relationships may be recorded in a blockchain where they can be consulted and updated as needed.

In examples of the present technology, a networked device may generate its own unique identity, e.g. by generating a public/private key pair. Networked devices may form relationships that allow them to recognize each other's public keys through blockchain transactions so as to provide an appropriate level of access to peers. Public keys of administrators or other higher-level entities may also be recognized through blockchain transactions so that the administrator or other entity has high-level access. These blockchain transactions can subsequently be consulted to verify identity of an entity and to determine an appropriate level of access for the entity. A range of access levels associated with a range of entities may be recorded in blockchains so that they can be easily and securely verified and updated.

It should be noted that, while some examples are described here with respect to particular types of blockchains (e.g. the Bitcoin blockchain and blockchains following the Bitcoin format, or UTXO-based blockchain) the present technology is blockchain agnostic (not limited to any particular blockchain) and may be implemented on an existing public blockchain (e.g. Bitcoin, Bitcoin cash, Ethereum, Ripple, Litecoin, etc.), or on a private blockchain (e.g. Hyperledger, Corda, Gem Health), and may use a dedicated blockchain or may be combined with a blockchain that serves other functions (e.g. transfer of value). The present technology may be applied to existing blockchains or may be implemented in a new blockchain, blockchains, sidechain, or other such structure.

Self-Generated Identities

A networked device may generate its own identity using pseudo-random functions, following the same principles as PGP. Such networked devices may be capable of independently generating their own keypairs and apply the needed signatures without the need of any trusted third party. A networked device's public key may be used to identify a specific networked device among multiple networked devices. A networked device's private key may be used to generate a proof of identity, tied to the public key.

Figure 7:
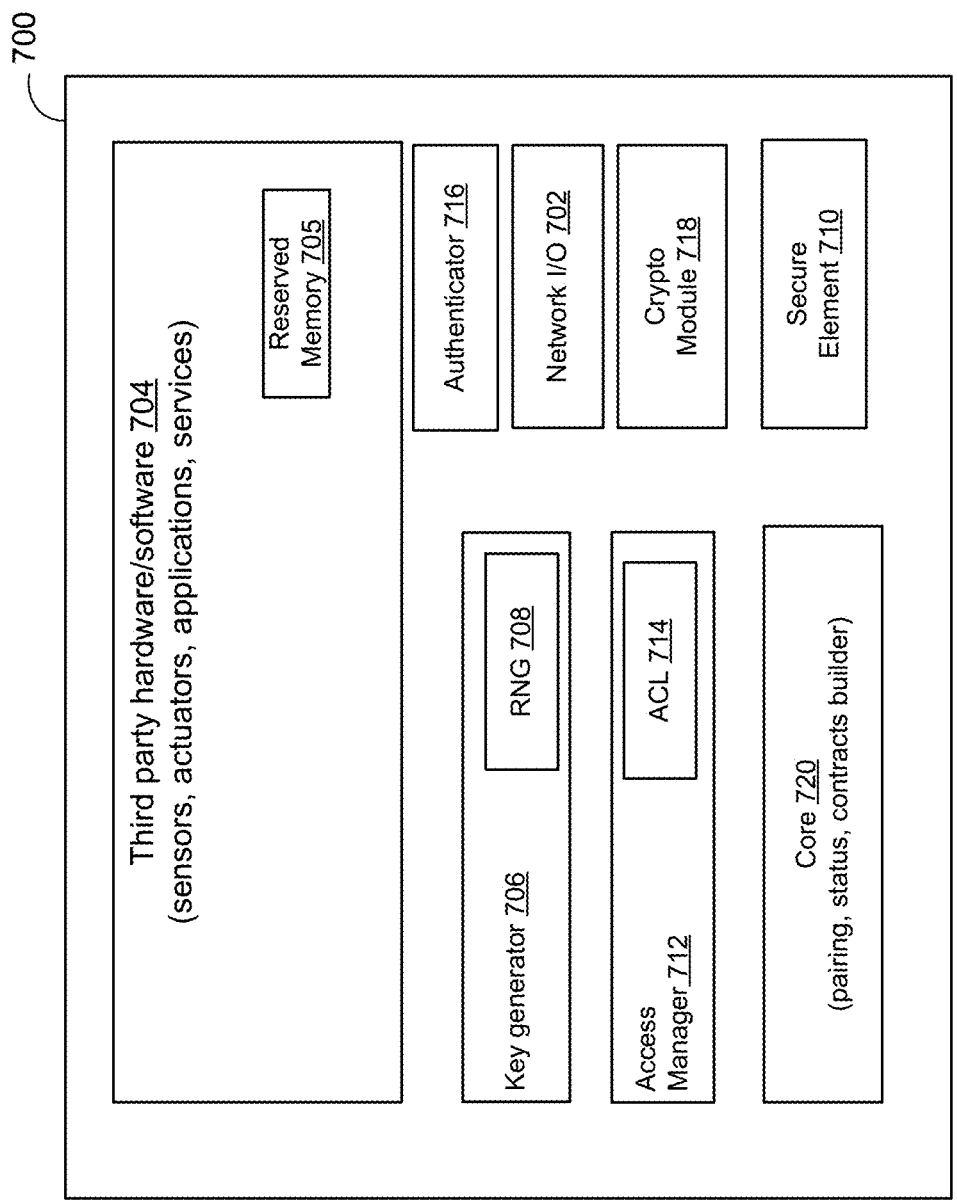
FIG. 7 illustrates an example of a networked device.

FIG. 7 shows an example of certain components of a networked device 700 that includes a network input/output (network I/O) 702 for connecting with a network. Network I/O 702 may be, for example, an Ethernet port, Universal Serial Bus (USB) port, or other such standard or custom port, a wireless communication I/O such as a Wi-Fi communication device (e.g. according to IEEE 802.11), WiMAXs communication device (e.g. according to IEEE 802.16), Bluetooth communication device (e.g. according to IEEE 802.15), or other such device capable of providing connection to a digital communication network. A network input/output in the present technology is not limited to using TCP/IP protocols and may use any digital communication link to communicate with another entity. A variety of networked devices may use aspects of the present technology with a range of digital communication links including, but not limited to TCP/IP protocol links.

Third party hardware/software 704 may include one or more hardware components such as sensors or actuators that are connected to a network through the network I/O. Third party hardware/software may also include applications and services that the networked device runs (e.g. routines related to sensors or actuators) on one or more processors and may include an area of reserved memory 705.

A key generator 706 is provided to generate a public/ private key pair, which may be strings of characters (strings of bits) that are randomly generated using a random number generator 708 (RNG) or pseudo-random number generator or other initiator to ensure that keys are unlikely to be the same from entity to entity. In other networked devices, keys may be created elsewhere and loaded into the networked devices. The addresses of Entity are operated through the standard Blockchain Improvement Protocol (BIP) 32 which allows it to generate a hierarchy of keys in a deterministic manner from a generator seed. Using a key generator within the networked device reduces risk of unauthorized access to the private key. In this networked device, the private key is created internally in the networked device and remains in the networked device throughout its operation (i.e. the private password is not sent outside the networked device or shared with any other entity).

A secure element 710 is provided to store the private key. The secure element may be a hardware secure element that maintains the private key so that it does not leave the networked device 700 and cannot be read through the network I/O 702 or otherwise and may not be recovered even through destructive testing. Thus, the private key of the networked device cannot be separated from the networked device for use by another networked device.

An access manager 712 includes an Access Control List (ACL) 714 that includes entries for entities that have access rights related to the networked device 700. Access rights can range from high-level rights (e.g. administrator rights to reconfigure the networked device, update firmware, modify the ACL, etc.) to low-level rights (e.g. right to receive a sensor output). A variety of rights may be listed for a variety of different entities including peers of the networked device. Entities listed in the ACL are identified by public keys so that they can be authenticated. The access manager may verify the identities of entities that communicate through the network I/O by using their public keys and only providing access to entities that can demonstrate that they have the corresponding private key.

An authenticator 716 uses the private key of the networked device 700 to authenticate communication and demonstrate that the networked device 700 has the private key associated with its public key.

A cryptographic "crypto" module 718 may use the networked device's private key to encode some outgoing communication so that it can only be decrypted by an entity that has the corresponding public key, and the communication is clearly demonstrated as being from the network device 700 (i.e. from an entity with the network device's private key).

A core 720 manages pairing, status, and acts as a contracts builder (building smart contracts). The core may be configured to interact with a blockchain (such as blockchain 600) through network I/O 702 by signing transactions that pair the networked device with other networked devices and by checking the blockchain to determine if the networked device has a relationship with a given entity (i.e. if there is a transaction linking them). The core 720 may initiate blockchain transactions (e.g. contracts) that create relationships between the networked device and other entities. The core 720 communicates with the access manager 712 to keep the ACL 714 current (e.g. by obtaining relevant transactions or contracts from a blockchain). Updating an ACL or other structure from a blockchain may be an asynchronous operation, e.g. updating may occur on some periodic schedule, or as relevant transactions are verified in a blockchain, or otherwise. Some cores may also maintain some blockchain blocks or an entire copy of a blockchain (i.e. the networked device may be a blockchain node) so that checking the blockchain may not require communication through the network I/O.

Initialization

In some examples, networked devices may complete an initialization process or "Imprinting Ceremony" with other previously enabled devices in order to join a decentralized mutual-recognition system based on cryptographic signatures (this may be considered analogous to keysigning parties performed by PGP users). An imprinting ceremony may take place as close as possible to the manufacturing moment, with the goal of exchanging the public keys in a secure environment and reduce the risk of man in the middle attacks. Since there is no third party involved, such networked devices may rely on a secure element to maintain the integrity (e.g. a secure hardware element that ensures that a private key cannot be accessed). An example of a public/private key based system has the following characteristics: the probability of two networked devices generating the same private key is close to zero; a compatible hardware secure element is provided within networked devices; it is economically inefficient to have two devices with the same private key.

Figure 8:
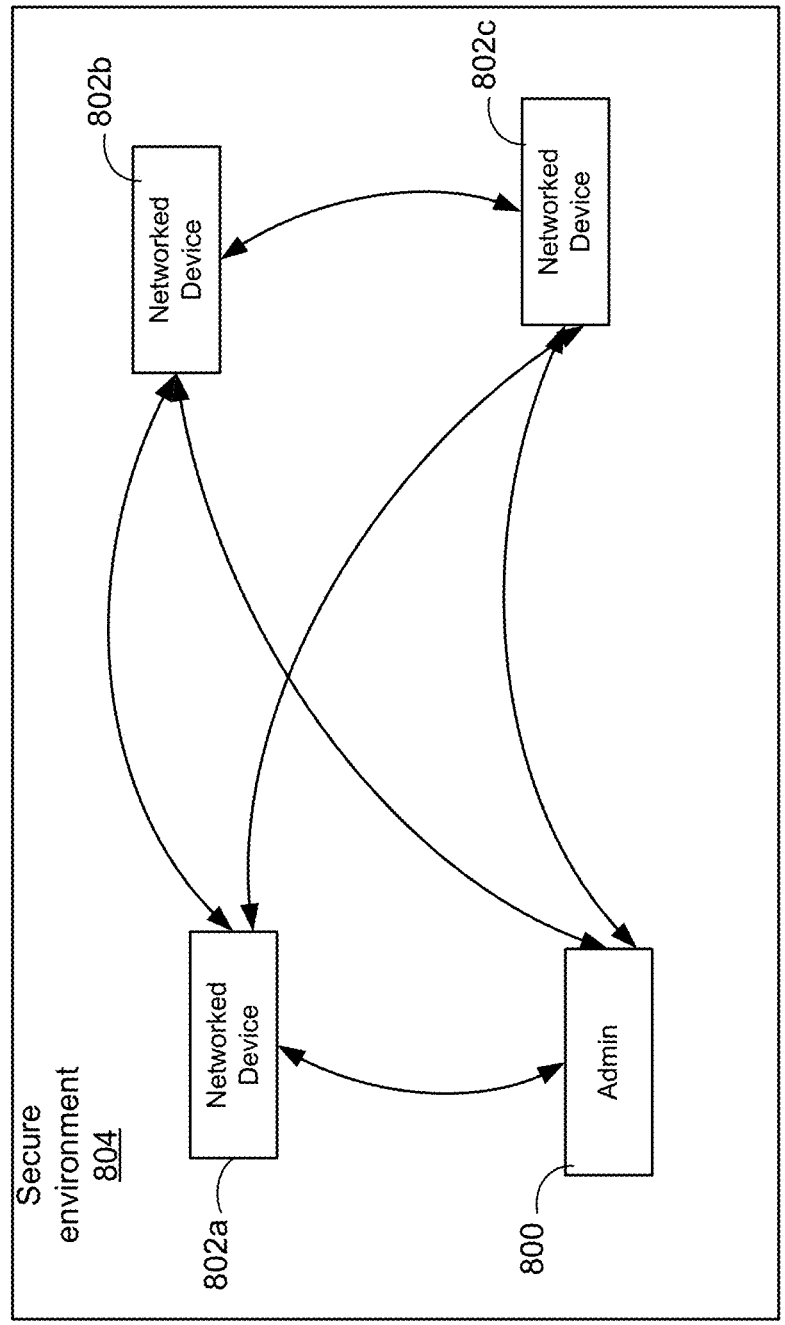
FIG. 8 illustrates an example of an imprinting ceremony.

FIG. 8 illustrates an imprinting ceremony in which an administrator 800 (or imprinter) and multiple networked devices 802a-c form relationships in a secure environment 804 (e.g. an environment in which networked devices can connect to each other with little or no risk of a man-in-the-middle attack). An example of a secure environment may be a manufacturing floor, or test area, where new networked devices are imprinted and where network access may be restricted to only physical devices within the secure environment. Other secure environments may be secure areas of a network and secure environments are not limited to physically contiguous areas. In some cases, at least some communication at this point may be through a physically secure input (for example, through an input that is different to the network I/O such as a test interface, e.g. a serial peripheral interface (SPI) or joint test action group (JTAG) interface). Such an input may be physically disabled afterwards (i.e. after imprinting and testing, before the network device is shipped).

Figure 9:
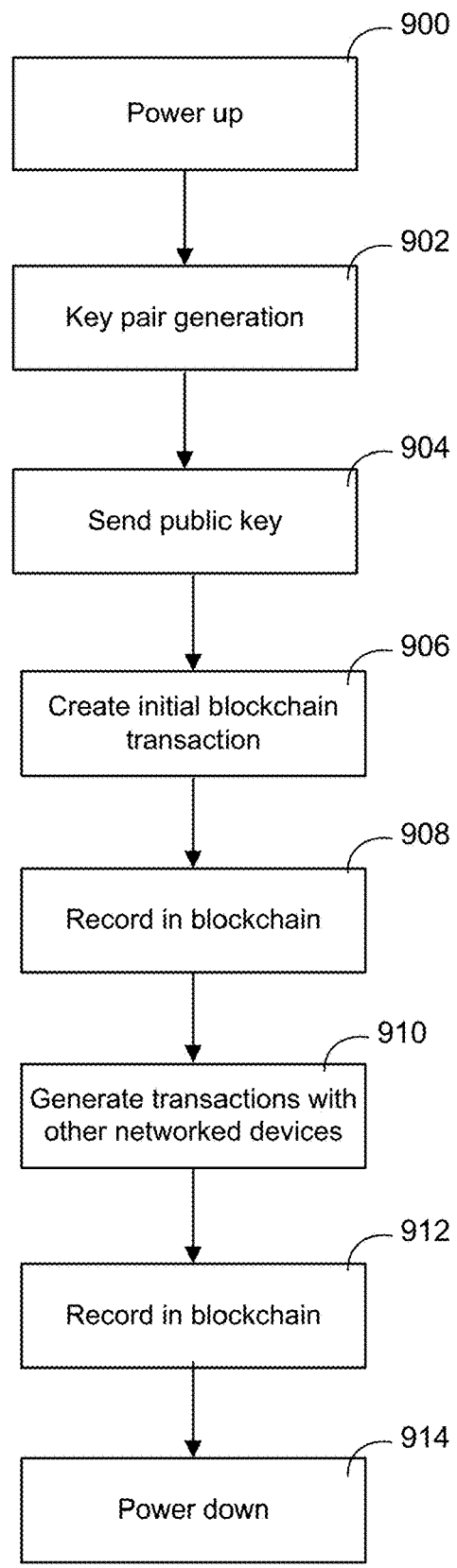
FIG. 9 illustrates an example of an initialization sequence.

FIG. 9 illustrates an example of an initialization sequence that includes key pair generation and an imprinting ceremony. The networked device is powered up 900 which may cause it to generate its own public/private key pair 902 (this may happen automatically when it first receives power or may require some input). The public key is then sent 904 to an administrator (e.g. manufacturer) and used to provide the networked device with tokens or coins by creating an initial blockchain transaction 906 or "imprinting contract" (i.e. the first transaction linked to the network device's public key). For example, an administrator may transfer some Bitcoin tokens, or other tokens, to the networked device as shown in FIG. 5 using the networked device's public key. The initial transaction is recorded in a blockchain 908. The initial transaction defines a relationship between the networked device and the administrator and may provide the administrator with full access (e.g. an ACL in the networked device may be updated according to the transaction to list the administrator with the highest access level). The public key may also be shared with other entities (other networked devices) within a secure environment by generating one or more transactions 910 between the networked device and the other entities. While the example of FIG. 8 shows an administrator 800 and three networked devices 802a-c, the number of entities that may form relationships in such an initiation sequence may be any suitable number and, in some cases, may be much more than shown. Some transfer of coins or tokens may occur as part of such transactions and to record the transaction in a block of the blockchain 912 (i.e. the miner's fee for including the transaction in a block). Other networked devices may receive some level of access as part of these transactions (e.g. some right to provide input to or receive output from the networked device). Subsequently, the networked device may be powered down 914 and may be shipped to a customer for use in a range of different applications. Subsequently, the networked device recognizes the entities that it linked to during the initialization sequence. When the networked device is subsequently powered up, it may look to see if any other relevant transactions are recorded in the blockchain and may respond accordingly if there are (e.g. by updating an ACL or performing other changes) so that it can become aware of updates to the blockchain that occurred while it was not connected to the network.

Distributed Ledger Operation

A smart contract between two entities (such as networked devices) may identify the following: the devices that are parties to the contract, identified through their public keys; which Application Program Interface (API) calls or opcodes can be remotely executed according to the transaction (e.g. the level of access that party has to another); the date, time and unique contract identifier (the transaction hash); and cryptographic signatures and additional verification data (e.g. duration). A device may formally commit itself to a smart contract by applying its cryptographic signature, using its private key. Once signed, a contract is mathematically binding between two devices. No third parties are needed to verify the signature and the hash of a smart contract; therefore, this protocol can be used to remotely authenticate and execute the commands written on the smart contract, without a trusted authentication and access management server.

A special type of smart contract is the Imprinting Contract discussed above: it is generally the first smart contract ever signed by a networked device and may be signed during the Imprinting Ceremony. This smart contract may unequivocally identify the public key of the administrator, granting the remote control of the device. This administrator may have the power to issue additional smart contracts, allowing other parties to access specific functionalities on the device.

Smart contracts may be stored on a distributed ledger with blockchain rules, based on the pegged sidechain theory. Thanks to the proof of work algorithm, every block of the blockchain can be mathematically verified through standard hashing functions, easily detecting any tampering attacks. Pegged sidechains may provide clusters of smart contracts for companies, places, product lines and specific functions. The protocol may generate nested sidechains with different heartbeat, block size and consensus rules, scaling the ledger on the required use. Through standard BIP44 wallet organization, a networked device can handle a large number of keys and sidechains, limited only by local storage and computing power.

A transaction such as a smart contract may use various techniques to convey data other than a simple transfer of a coin or token. In some blockchains, some metadata may be recorded in a transaction. Such metadata may be used to convey, for example, levels of access to be provided to different entities that may try to access a networked device or other aspects of a relationship between networked devices. For example, in the Bitcoin blockchain, a portion of a transaction referred to as OP_return is an opcode that allows 80 Bytes of metadata to be stored in a transaction. This allows the initiator of a transaction to provide instructions along with a transfer of tokens. In this way, instructions may be transferred between networked devices using existing blockchain structures by paying relatively small fees (i.e. some cost to pay miners for including the transaction in a blockchain). For example, certain bits in OP_return or other metadata structure may be mapped to permission to access certain resources in a Remote Procedure Call (RPC) scheme that is understood by appropriately configured networked devices. For example, a given bit may represent a specific permission, with a 0 bit indicating that permission is denied, and a 1 bit indicating that permission is granted (or vice versa—assignment of 1 and 0 bits is arbitrary). In some examples, a lightweight RPC scheme may be implemented using a small number of bits (e.g. 127 bits) stored as metadata in a blockchain transaction to implement access management in a secure manner.

Aspects of the present technology may use blockchains and blockchain related technology in a variety of different implementations. In one embodiment, one or more sidechains are created to support secure transactions between networked devices. While some implementations aspects of the present technology may take advantage of established blockchains directly by sending transactions between networked devices for inclusion in blocks of a blockchain (such as Bitcoin, Ethereum, or other blockchains), in other implementations such established blockchains are used indirectly, providing a basis for one or more sidechains that branch off from a main blockchain and may provide dedicated platforms for transactions between networked devices.

Figure 10:
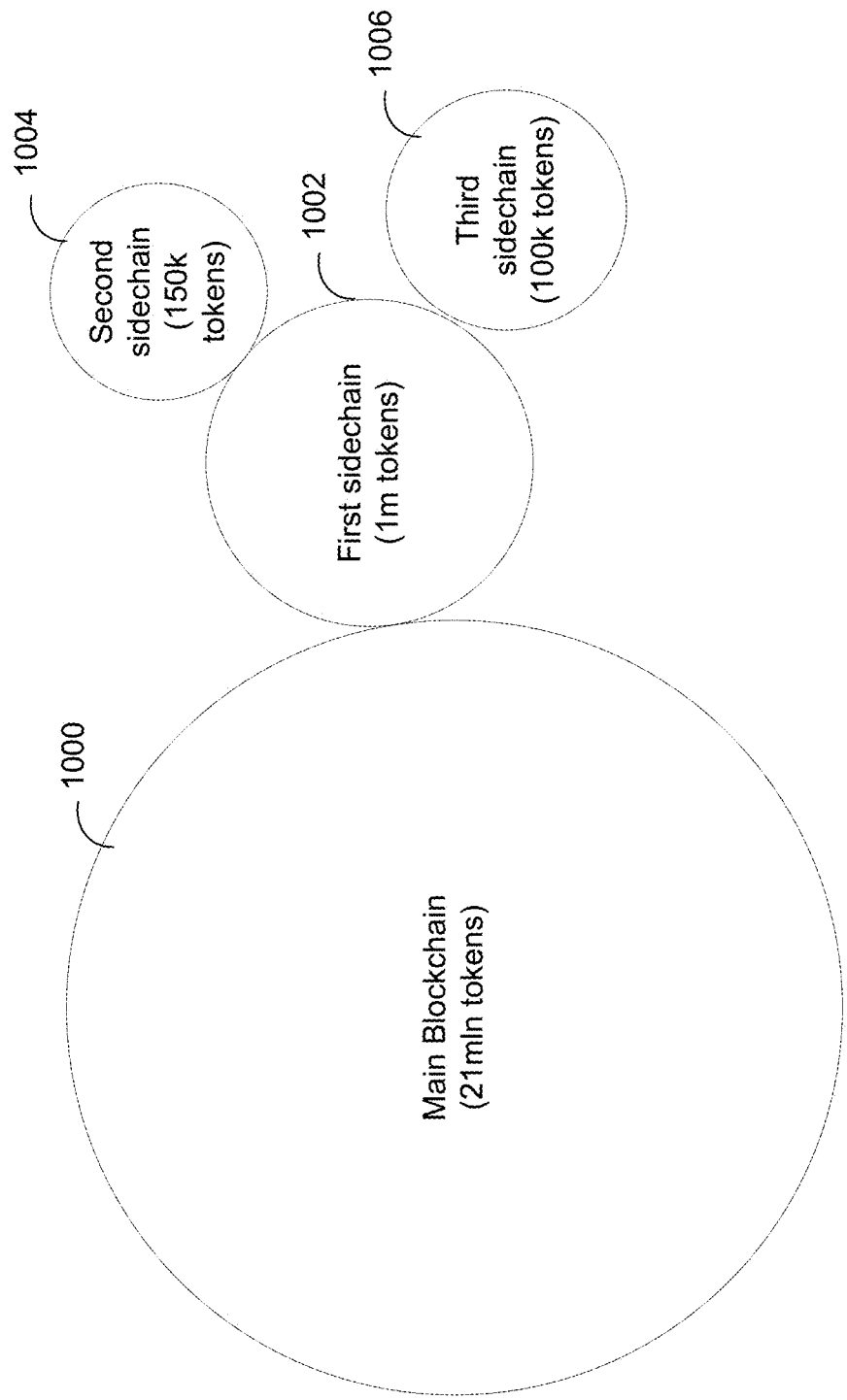
FIG. 10 illustrates a blockchain and sidechains.

FIG. 10 illustrates an example of a main blockchain 1000 with 21 million tokens. A first sidechain 1002 extends from the main blockchain 1000 with 1 million tokens. It will be understood that a sidechain is a blockchain that branches off from a main blockchain and operates using the same algorithms as the main blockchain. For example, the first sidechain 1002 may be a common sidechain available to a range of networked devices from a range of different manufacturers and used by different customers. Second sidechain 1004 and third sidechain 1006 branch off from the first sidechain 1002 and have fewer tokens (150,000 and 100,000 respectively) and may be used by particular groups of networked devices. For example, networked devices from a particular manufacturer may use the second sidechain 1004 while networked devices from a different manufacturer may use the third sidechain 1006. Or different types of networked devices may use different sidechains (e.g. smartphones may use the second sidechain 1004 while internet cameras use the third sidechain 1006). Companies that deploy networked devices may have their own dedicated sidechain. Sidechains may be formed on-demand as needed and may be customized (e.g. cost, speed, etc.) to needs of specific network devices, or customers. Thus, a common ecosystem may support separate ledgers for different users.

In order to ensure that a sidechain is supported (i.e. that there are a sufficient number of nodes to ensure security) without paying a large fee to miners, merged mining may be used to incentivize miners that are mining the main chain to also mine the subchain. Merged mining is the process of mining different blockchains based on the same algorithm (e.g. main blockchain and a sidechain) simultaneously. This allows a low hash powered blockchain (e.g. sidechain) to increase its hashing power by bootstrapping onto a more popular blockchain. All the transactions for both networks may be ordered and their merkle trees hashed out. The two blockchains may be classified as the parent and the auxiliary blockchain (e.g. main and sidechain). The Auxiliary blockchains merkle root is inserted into an extra nonce section of the parent blockchain. As the information of one chain's set of hashes has been incorporated into a superfluous part of the other blockchain then a proof of work can be considered to have been achieved if a solution with a specific difficulty has been performed. The difficulty may be lower for an auxiliary blockchain (or sidechain) as there is less network power on that chain—i.e. the number of zeroes in the hash is less (where difficulty is set by the number of zeros required for a block hash to meet requirements and for a miner to get paid). In this way, miners operating on a main blockchain are incentivized to also mine subchains so that even if they fail to receive payment for being first to hash a block of the main blockchain they may still receive some (generally lesser) payment for successfully hashing a block of the sidechain where the requirements for a successful hash are reduced.

EXAMPLES

Figure 11:
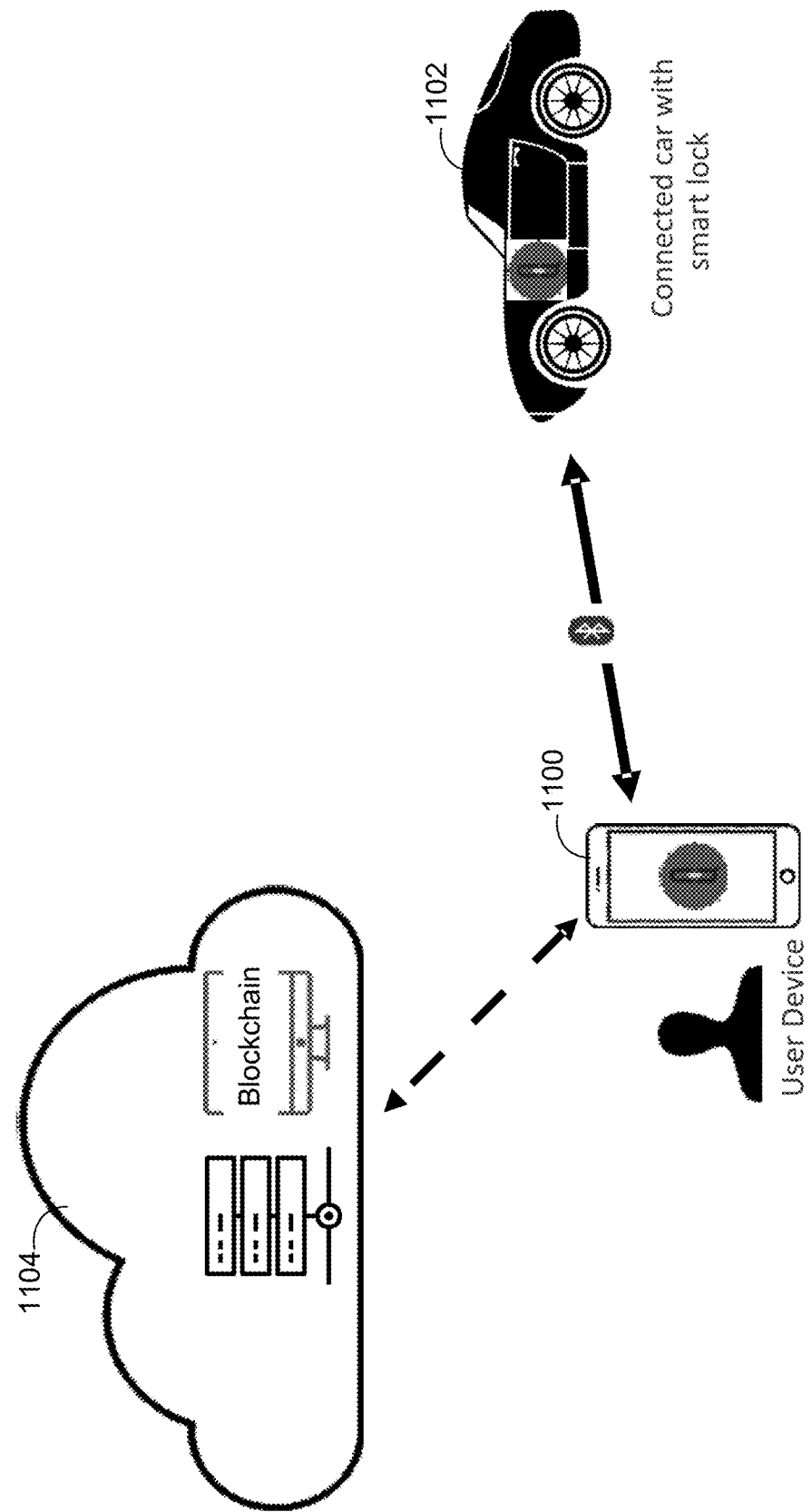
FIG. 11 shows an example of use of a blockchain between a user device and a vehicle.

FIG. 11 shows an example of a first networked device 1100 (user device such as a smartphone) having a secure connection with a network connected car 1102 (using Bluetooth in this example) using a transaction stored in a blockchain 1104 to authenticate the connection. Car 1102 may include one or more networked devices such as networked device 700 that can connect with a blockchain and with other networked devices, including smartphones such as a user's smartphone, and may give different levels of access to other networked devices according to information obtained from blockchain transactions. Such a connection may be used to unlock the car 1102 or perform other functions (turn on car ignition to warm car 1102, turn on/off air conditioning, turn on on/off lights, interact with GPS to locate car 1102, interact with a security system to set security or check security, interact with engine system to obtain engine information, etc. depending on the level of access provided by blockchain transactions). It will be understood that a variety of different networked devices may have different access to a car, e.g. the manufacturer or mechanic may have access to specific engine data, or access to allow updating software, while the owner may have access to locks, lights, ignition, etc. Temporary access may be provided e.g. to allow friends, colleagues, or family to access GPS during a specified time with access updated via blockchain transactions, to allow someone to temporarily use the car (e.g. so that a friend can borrow the car), or to allow for maintenance operations to be performed.

In some cases, it may be desirable to link a user's networked device (e.g. a smartphone) with a vehicle network device so that the user can access one or more functions through their networked device (vehicle user networked device such as a smartphone), thus providing convenience and security. An access control list, such as ACL 714, in a networked device in a vehicle may provide different levels of access to different users, for example providing a level of access that allows a vehicle user to lock and unlock vehicle locks, or to allow a vehicle user to turn vehicle ignition on and off, to access vehicle location data, vehicle maintenance data, vehicle payment data, or other vehicle-related data. Having such a function available through a smartphone may obviate the need to use a separate physical key to lock/unlock a vehicle and/or operate vehicle ignition. Such a key may be transferrable through a blockchain transaction (which may include a fee so that a vehicle may be rented through a smart contract that exchanges some value for access rights to a vehicle) or additional keys may be created as desired using blockchain transactions. Locking and unlocking may be based on proximity of a networked device (e.g. smartphone) to the vehicle (e.g. car) so that the vehicle automatically unlocks as an authorized user approaches and automatically locks after an authorized user exits. Verifying a user's authorization using blockchain provides a high degree of security. A smartphone may provide additional security that is not available with a simple key (e.g. by checking for a personal identification number or "PIN," password, or checking biometric data such as a fingerprint, retinal scan, etc.). Access may be provided remotely, without moving or hiding physical keys. This may be implemented for a fleet of vehicles over a range of locations with driver access that changes (e.g. for a fleet of rental cars, trucks, vans, etc., car-sharing fleets, or for a commercial fleet of vehicles that may have different drivers at different times).

Figure 12:
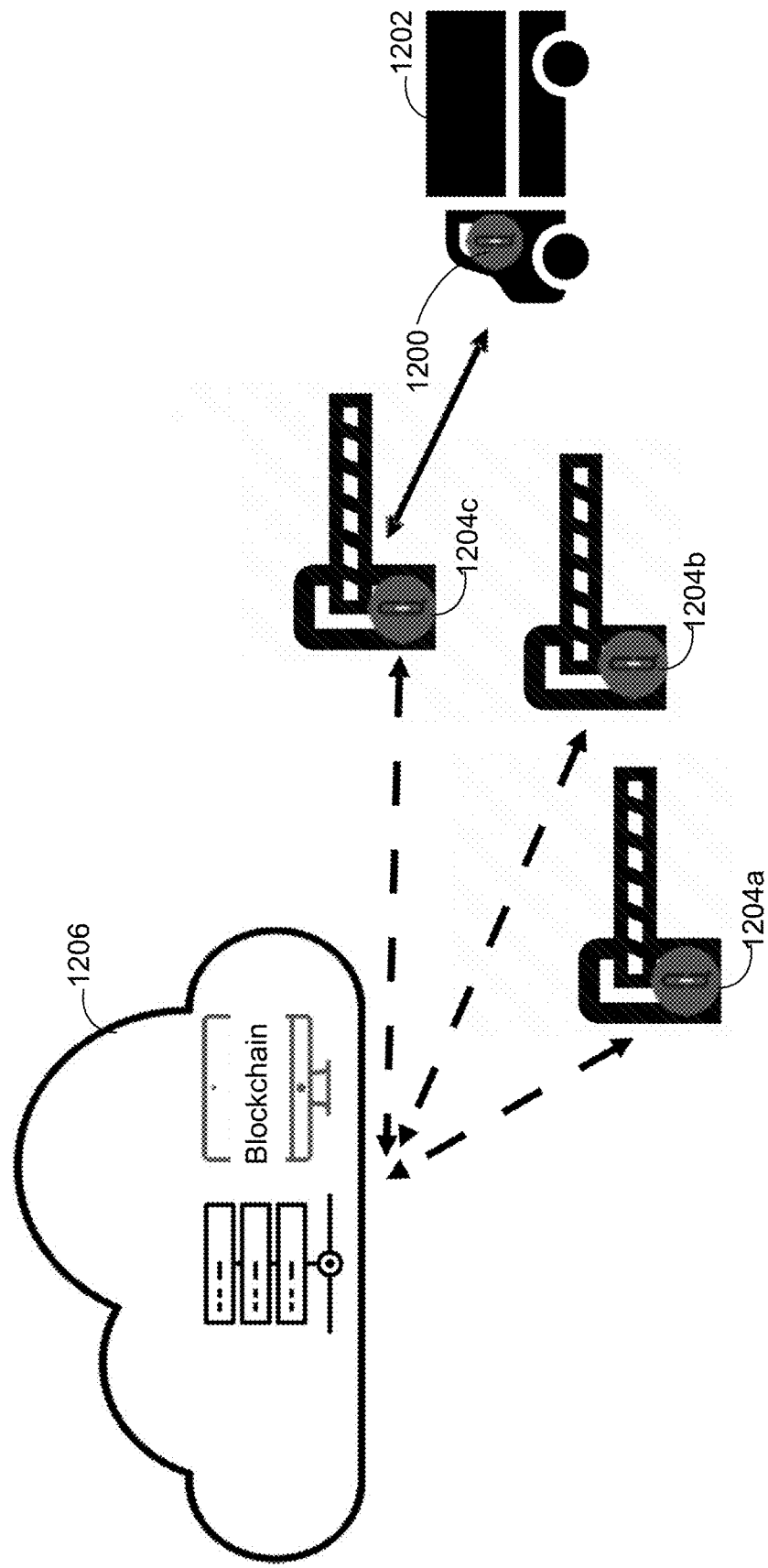
FIG. 12 illustrates an example of use of blockchain between a networked device in a vehicle and networked devices external to the vehicle.

FIG. 12 shows an example of a first networked device 1200 (in a vehicle 1202) that interacts with one or more second networked devices 1204a-c (which, in this example, are in barriers controlling vehicular traffic). A communication from the first networked device 1200 in the vehicle 1202 is received by a second networked device 1204c in a barrier system and the second networked device 1204c looks to blockchain transactions in blockchain 1206 to determine if there is a smart contract between the first and second networked devices and if so, whether the level of access provided to the vehicle 1202 allows it to pass. If a blockchain transaction indicates that the networked device has the appropriate level of access, then the barrier is raised. In some cases, payment may be made via the blockchain 1206 to allow the vehicle to pass, e.g. a transfer of some coin or token for parking, use of a toll road, or other service, automatically triggers a barrier lifting. Similarly, a networked device in a service station may control access to refueling by checking a blockchain transaction to verify vehicle payment data. Thus, a pump may pump fuel when a vehicle is verified as having sufficient funds to pay for fuel and payment may be automatically made through a blockchain transaction (using a virtual currency such as Bitcoin, or by debiting an account, or through some other transaction). Similarly, an electric recharging station may provide electrical current based on a blockchain transaction that indicates that a vehicle or its user have sufficient funds and/or a blockchain transaction transferring such funds. It will be understood that levels of access may vary so that some networked devices may have only daytime access, or only weekday access, while others may have unlimited access. Networked devices may be specific to vehicles (e.g. part of the vehicle that is difficult to remove from the vehicle so that the networked device's key effectively identifies the vehicle) or may be separable from the vehicle (e.g. a transponder that a user can move from vehicle to vehicle, the user's smartphone, or some other networked device in a vehicle). While the example of FIG. 12 includes physical barriers, in other examples, tolls and parking fees may be collected automatically based on proximity to networked transponders without using physical barriers, e.g. based on GPS location of a networked device in a vehicle, or otherwise.

Various vehicle-related data may be stored in blockchain transactions so that the data is later verifiable with a high degree of security. In addition to payment data that may automatic payment of tolls, parking charges, etc., vehicle ownership and maintenance data may be recorded in blockchain transactions so that such data may be verified by a subsequent buyer, by law enforcement agencies, or other parties.

Figure 13:
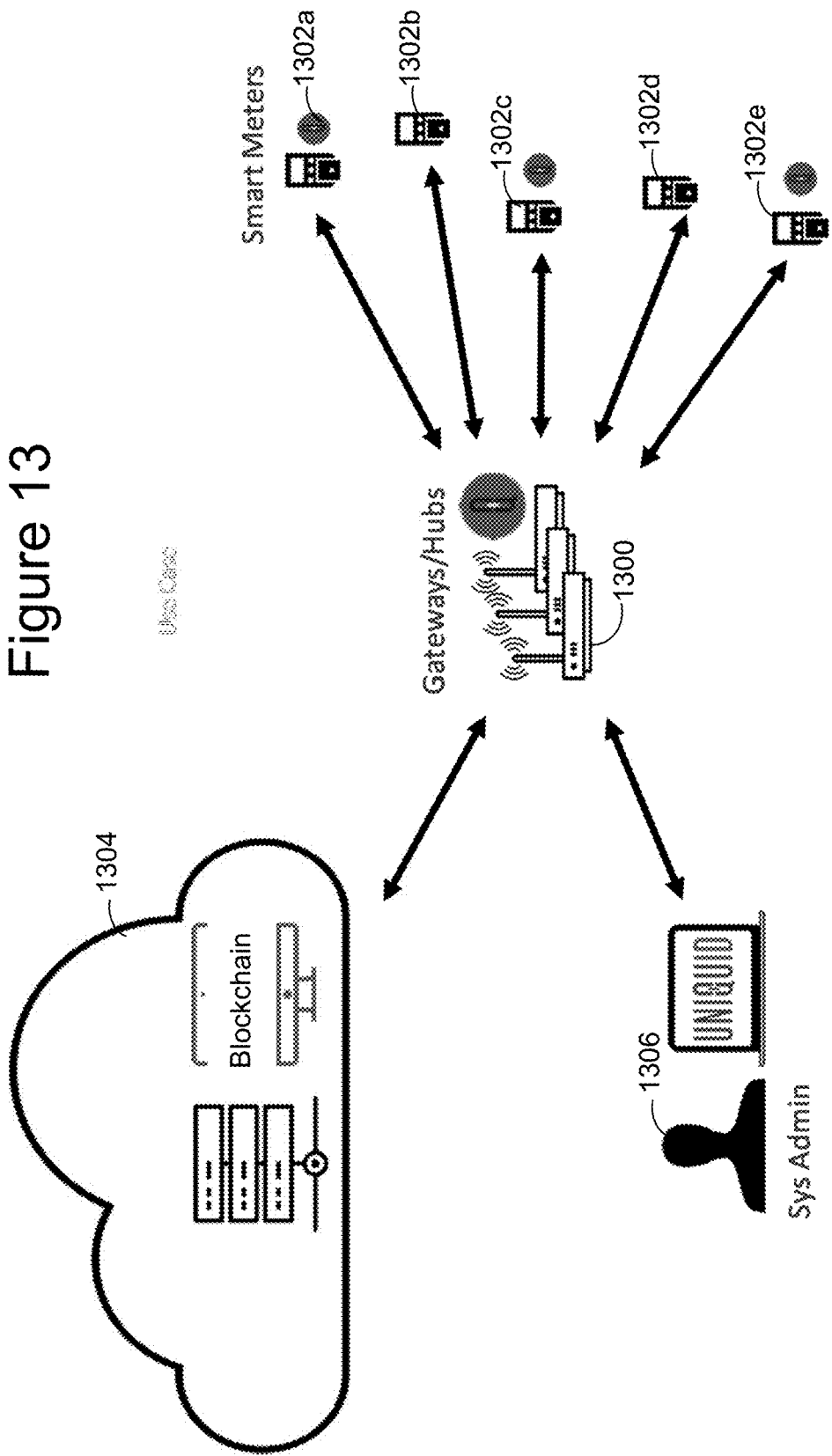
FIG. 13 illustrates an example of use of blockchain for networked smart meters.

FIG. 13 illustrates a system connecting first networked devices 1300 (gateways/hubs) with second networked devices 1302a-e (smart meters) using secure connections that are authenticated using a blockchain 1304. Smart meters 1302a-e may provide data from various locations in a manner that is secure (i.e. users cannot easily send falsified readings) to first networked devices 1300 (gateways/hubs) that authenticate the second smart meters' identities using blockchain transactions. A system administrator 1306, and or other users, may also use this secure communication to access smart meters 1302a-e e.g. to reconfigure them, upgrade software, run tests, etc. Some smart meters may interact with various users that have various levels of access. For example, an electricity meter may be read by a property owner e.g. using a smartphone or PC, while other functions may only be available to a utility company that owns the meter.

Figure 14:
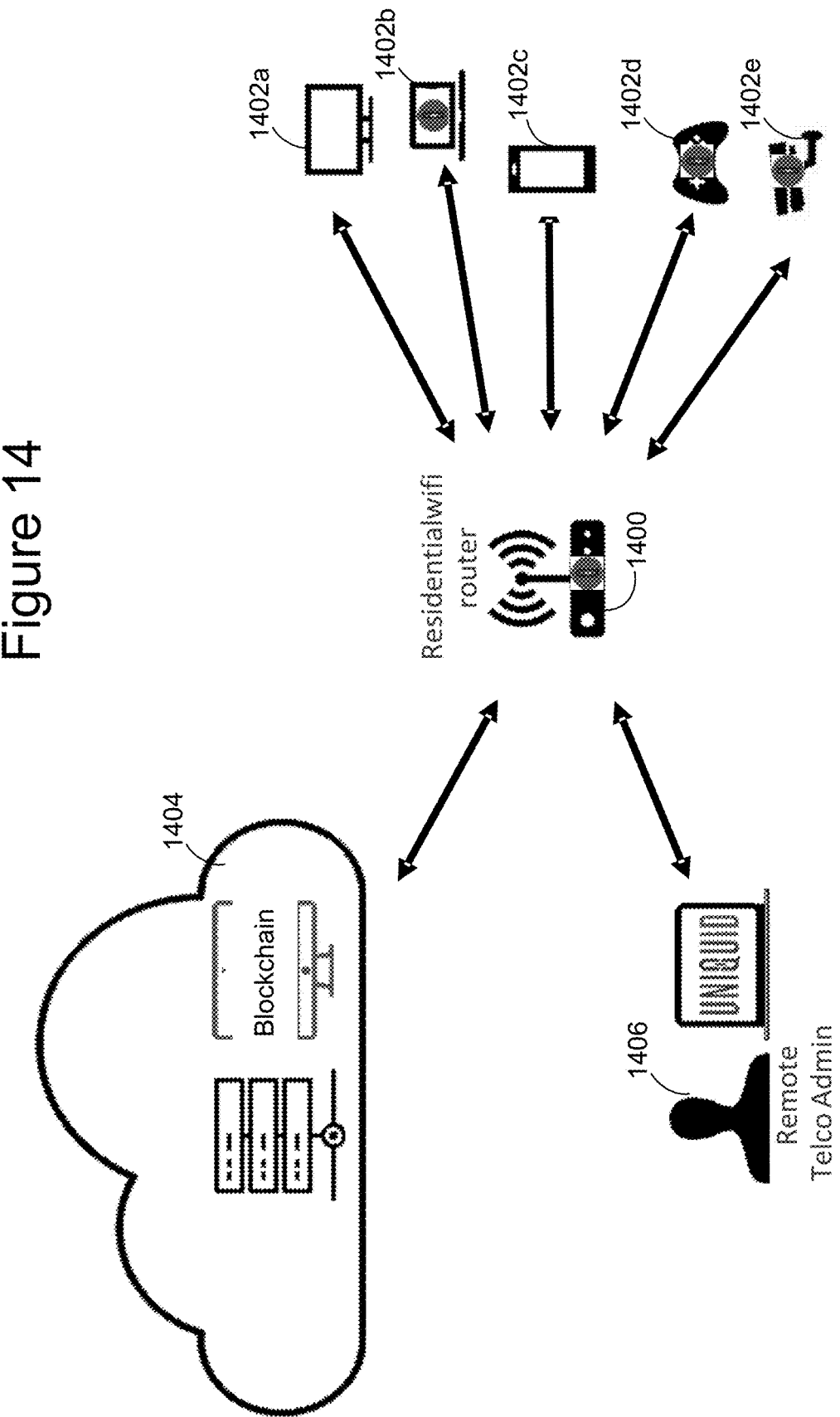
FIG. 14 illustrates an example of using a blockchain to control access of networked devices in a wireless network.

FIG. 14 shows an example of a home network in which a Wi-Fi router 1400 acts as a first networked device that forms secure connections with a variety of other networked devices 1402a-e (TV 1402a, laptop 1402b, smartphone 1402c, game console 1402d, security camera 1402e, etc.) using blockchain transactions recorded in a blockchain 1404 to provide appropriate levels of access to each device (e.g. controlling access to the Internet or other digital resources). For example, different networked devices within the home may have different levels of access to digital content according to license agreements, subscription agreements, or other limitations. Wi-Fi router 1400 may also be accessed and configured by a remote telecommunications administrator 1406.

Figure 15:
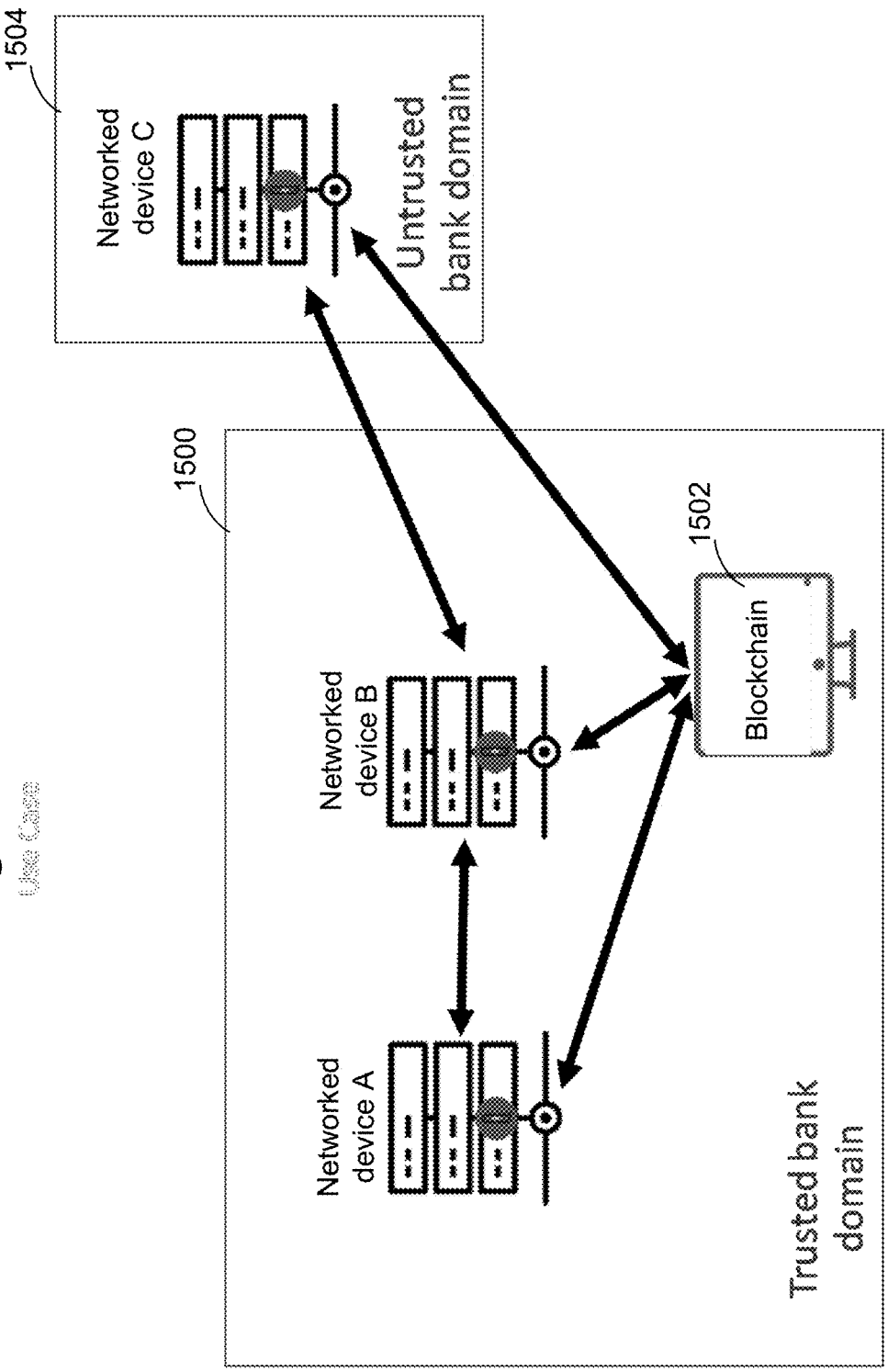
FIG. 15 illustrates an example of blockchain transactions in a banking system.

FIG. 15 shows an example of a banking system that uses blockchain transactions to form secure connections between networked devices. A trusted bank domain 1500 may be formed by a one or more blockchain transactions that form relationships between networked devices and indicate a high level of access to other networked devices within the trusted bank domain. Thus, networked device A and networked device B may consult transactions in a blockchain 1502 to identify what levels of access to provide to each other, which in this case are high levels of access. When communicating with an untrusted bank domain 1504 (e.g. a networked device that is not known to be secure, or whose ownership or control is unclear) a blockchain transaction may indicate a much lower level of access. Thus, a transaction in the blockchain may indicate a lower level of access for Networked device C than for Networked device A when they try to access Networked device B.

Note that the discussion above introduces many different features and many embodiments. It is to be understood that the above-described embodiments are not all mutually exclusive. That is, the features described above (even when described separately) can be combined in one or multiple embodiments.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A networked device comprising:
   a network input/output;
   an access control list in the networked device, the access control list providing a plurality of additional networked devices with a plurality of different available levels of access for accessing the networked device through the network input/output; and
   an access manager in the networked device, the access manager configured to update the access control list from a blockchain via communication with the blockchain through the network input/output.

2. The networked device of claim 1 further comprising a key pair generation unit configured to generate a private key and a corresponding public key for the networked device.

3. The networked device of claim 1 further comprising secure element storing a private key of the networked device.

4. The networked device of claim 1 further comprising an authenticator configured to use a private key of the networked device to authenticate communication and demonstrate that the networked device has the private key associated with a public key of the networked device.

5. The networked device of claim 1 wherein the access control list includes public keys of a plurality of entities connected to the networked device through the network input/output.

6. The networked device of claim 1 wherein the access manager is configured to update the access control list according to metadata stored in a transaction in the blockchain.

7. The networked device of claim 1 wherein the networked device is located in a vehicle and the access control list provides a level of access to a vehicle user that allows the vehicle user to lock and unlock vehicle locks.

8. The networked device of claim 7 wherein the level of access further allows the vehicle user to turn vehicle ignition on and off.

9. A system comprising:
   a plurality of networked devices, each individual networked device of the plurality of networked devices comprising:
   a network connection;
   a key generator configured to generate a public/private key pair for the individual networked device;
   a private key store containing the private key of the individual networked device;
   an identity authenticator configured to authenticate identity of the individual networked device using the private key of the individual networked device;
   an access control list in the individual networked device, the access control list assigning to other networked devices of the plurality of networked devices a plurality of different levels of access for accessing the individual networked device; and
   an access manager in the individual networked device, the access manager configured to update the access control list from a blockchain through the network connection.

10. The system of claim 9 wherein the plurality of networked devices are located in a plurality of vehicles, an access control list of an individual networked device configured to control access to one or more of: vehicle locks, vehicle ignition, vehicle location data, vehicle maintenance data, and vehicle payment data.

11. The system of claim 10 wherein the access control list of the individual networked device is configured to grant a smartphone of a vehicle user access to at least vehicle locks and vehicle ignition through a blockchain transaction.

12. The system of claim 10 wherein the access control list of the individual networked device is configured to grant a toll-collecting networked device access to at least vehicle payment data.

13. The networked device of claim 1 wherein the networked device includes one or more sensors or actuators connected to a network through the network input/output and the plurality of different available levels of access include access to the one or more sensors or actuators.

14. The networked device of claim 13 wherein the networked device is specific to a vehicle such that a private key of the networked device identifies the vehicle, the plurality of additional networked devices include one or more smartphones, the access control list provides the one or more smartphones with access to ignition and/or locks of the vehicle.

15. The networked device of claim 14 wherein the access control list further provides a manufacturer and/or mechanic with engine data of the vehicle.

16. The networked device of claim 1 wherein the networked device is a smart meter and the access control list assigns a first level of access to a property owner and assigns a second level of access to a utility company.

17. The networked device of claim 1 wherein the plurality of additional networked devices in the access control list include first additional networked devices added to the access control list in an initialization process prior to shipment of the networked device and second additional networked devices added to the access control list subsequent to shipment of the networked device.

18. The networked device of claim 1 wherein relationships between the networked device and the plurality of additional networked devices are individually stored in metadata of transactions in the blockchain.

19. The networked device of claim 17 wherein the blockchain is a Bitcoin blockchain, each relationship between the networked device and an individual additional networked device is recorded in a Bitcoin transaction between the networked device and the individual additional networked device, and a level of access assigned to the individual additional networked device for accessing the networked device is recorded in an OP_return area of the Bitcoin transaction.

20. A system comprising:
   a first networked device comprising:
   a first network connection;

a first key generator configured to generate a first public/private key pair for the first networked device;

a first private key store containing the first private key of the first networked device;

a first identity authenticator configured to authenticate identity of the first networked device using the private key of the first networked device;

a first access control list in the first networked device, the first access control list assigning to one or more other networked devices a plurality of different levels of access for accessing the first networked device; and a first access manager in the first networked device, the first access manager configured to update the first access control list from a blockchain;

a second networked device located in a vehicle comprising:

a second network connection;

a second key generator configured to generate a second public/private key pair for the second networked device, the second private key specific to the vehicle;

a second private key store containing the second private key of the second networked device;

a second identity authenticator configured to authenticate identity of the second networked device using the private key of the second networked device;

a second access control list in the second networked device, the second access control list assigning to one or more other networked devices a plurality of different levels of access for accessing the second networked device including providing the first networked device with access to one or more lock systems and ignition systems of the vehicle; and a second access manager in the second networked device, the second access manager configured to update the second access control list from the blockchain, the blockchain including at least one blockchain transaction between the first networked device and the second networked device.

* * * * *